United States Patent [19]
Barz et al.

[11] Patent Number: 5,567,464
[45] Date of Patent: Oct. 22, 1996

[54] PROCESS OF MAKING MOZZARELLA CHEESE

[75] Inventors: Richard L. Barz, Littleton; Carolyn P. Cremer, Denver, both of Colo.

[73] Assignee: Leprino Foods Company, Denver, Colo.

[21] Appl. No.: 389,932

[22] Filed: Feb. 16, 1995

[51] Int. Cl.$^6$ .................................................. A23C 19/14
[52] U.S. Cl. ........................... 426/582; 426/276; 426/654
[58] Field of Search ..................................... 426/582, 654, 426/276

[56] References Cited

U.S. PATENT DOCUMENTS

| | | | |
|---|---|---|---|
| 2,319,187 | 5/1943 | Ingle | 426/582 |
| 2,733,148 | 1/1956 | Russo . | |
| 3,615,586 | 10/1971 | Rohlfs et al. | 99/115 |
| 3,961,077 | 6/1976 | Kielsmeier | 426/36 |
| 4,012,534 | 3/1977 | Kichline et al. | 426/582 |
| 4,075,360 | 2/1978 | Rule et al. | 426/582 |
| 4,143,175 | 3/1979 | Whelan et al. | 426/582 |
| 4,197,322 | 4/1980 | Middleton | 426/36 |
| 4,226,888 | 10/1980 | Siecker | 426/36 |
| 4,919,943 | 4/1990 | Yee et al. | 426/582 |
| 4,940,600 | 7/1990 | Yokoyama et al. | 426/582 |
| 5,030,470 | 7/1991 | Kielsmeier et al. | 426/582 |
| 5,080,913 | 1/1992 | Gamay | 426/39 |
| 5,104,675 | 4/1992 | Callahan et al. | 426/582 |
| 5,200,216 | 10/1990 | Barz et al. | 426/582 |
| 5,225,220 | 7/1993 | Gamay | 426/39 |
| 5,234,700 | 8/1993 | Barz et al. | 426/42 |
| 5,350,595 | 9/1994 | Hockenberry | 426/582 |
| 5,395,630 | 3/1995 | Gamay | 426/39 |
| 5,466,477 | 11/1995 | Sevenich | 426/582 |
| 5,470,595 | 11/1995 | Kopp et al. | 426/231 |

FOREIGN PATENT DOCUMENTS 141283  5/1971  Czechoslovakia.

OTHER PUBLICATIONS

21 CFR §§ 133.169, 133.173, 133.175, 133.178, and 133.179.

*Primary Examiner*—Helen Pratt
*Attorney, Agent, or Firm*—Fitzpatrick, Cella, Harper & Scinto

[57] ABSTRACT

A process of manufacturing a mozzarella (or mozzarella-like) cheese comprising the steps of a) pasteurizing cow's milk; b) acidifying the milk to convert it to a cheese milk; c) coagulating the cheese milk to obtain a coagulum comprised of curd and whey; d) cutting the coagulum and draining the whey therefrom, thereby leaving a cheese curd; e) heating, kneading, and stretching the cheese curd until it is a homogeneous, fibrous mass of heated, unripened cheese; f) forming the heated cheese into a shape; g) cooling the shaped cheese in cold brine; and h) removing the cooled cheese from the brine. The process is improved by mixing an emulsifier such as a sodium phosphate or citrate into the heated cheese after it has been heated, kneaded, and stretched, but before it has been formed into a shape. The resultant cheese provides good baking performance over a wider range of conditions than the equivalent cheese without emulsifier, and it is particularly useful as the stuffing cheese for stuffed crust pizza or as the exposed topping cheese on pizzas.

17 Claims, 3 Drawing Sheets

PROCESS OF MAKING MOZZARELLA CHEESE

FIELD OF INVENTION

The present invention relates to a procedure, within the manufacturing processes of mozzarella cheese varieties and/or mozzarella-like products, e.g., string cheese, which incorporates into the melted cheese, after heating/stretching of the curd, yet prior to extruding/forming the molten cheese into a mold, ribbon, etc., one or more food additives that, when properly used, will allow the cheese manufacturer to alter the performance characteristics of the mozzarella cheese being produced to achieve desired, optimum performance characteristics over a broader range of applications by an end user, typically a pizza restaurant. In addition, it will allow one to manufacture mozzarella-like products, e.g., string cheese, having performance characteristics similar to that of mozzarella cheese when baked within and/or on a pizza.

BACKGROUND

The pizza industry, as well as other users of mozzarella cheeses, continues to develop products in which mozzarella cheese varieties and/or mozzarella-like styles of cheese are used over a broader range of applications. The most common practice of such is within the pizza industry. A greater variety of pizzas, changes in oven styles, cook conditions, etc., continue to be developed to maintain and/or increase a specific company's market share. The result of such growth and changes is that each of these changes typically affects the portioning of the cheese (ease of dividing into portions) and/or the amount of heat available during the cooking process to melt the cheese. The changes in the amount of heat available for cooking result in differences in overall melt performance and flavor of the mozzarella cheese on the finished, baked pizza; yet it is desired by the pizza industry that the portioning of the cheese improve, or at least not suffer, while the melt and flavor characteristics of the cheese remain the same.

Additionally, any changes that a manufacturer may make in an attempt to achieve a consistent, optimum melt and flavor performance for a specific application may impact the handling/portioning of the cheese, which is most commonly understood to be the cut integrity and firmness of the cheese; thus a product which performs and meets the melt and flavor characteristics, yet does not handle/portion adequately, is not acceptable to the pizza industry. As regards portioning, in an attempt to control food costs, greater accuracy as to the free flowing, cut integrity of the product is required.

Also, it has been proposed in the industry to offer a pizza in which mozzarella-style string cheese is rolled into the edge, or "lip" of the pizza dough prior to baking The pizza is then prepared in the traditional manner with sauce, cheese, etc., and baked using ovens and procedures widely accepted in the pizza industry. Upon baking the pizza, the cheese is supposed to melt, such that it loses its original shape, and exhibits excellent "stringy" characteristics. However, conventional string cheese melts too much and quickly flows out of the crust into which it was originally rolled. And once the pizza is cooled, the string cheese in the "lip" of the crust has a short texture, so that when it is bitten into, the cheese breaks off too cleanly, and does not swell or very slowly flow out of the crust, as is desired.

Varieties of mozzarella string cheese are commonly produced one of two ways. The first is to extrude mozzarella curd into a specific size and shape and immediately freeze the product. The second method is similar to the first, with the exception that the product is gas-flushed, and held in a refrigerated state. Neither of these two processes results in an acceptable product for the described applications. Both of these processes results in a product which lacks good meltdown qualities and is generally too tough upon cooling. An alternative product, a type of processed cheese, has been determined not to be satisfactory, as it tends to lack the desired "stringy" characteristics once cooked, and also often overmelts and flows quickly out of the "lip" of the crust.

Prior to this invention, the processes of manufacturing mozzarella cheese and/or mozzarella like products have been limited in their ability to produce products that have similar performance characteristics over a broad range of applications, and thus the end user has had to accept product that does not fully meet expectations of performance characteristics over a broad range of baking conditions.

Thus the application of mozzarella cheese varieties and mozzarella-like products continues to grow and expand within the pizza industry, as well as its use by the food service/institutional industries. A reason for this continued growth is that the performance characteristics of mozzarella cheese is typically preferred over other cheeses when it is portioned and baked on a food product. Generally the desired performance characteristics are the melt characteristics that the cheese exhibits when baked. These characteristics include meltdown, stretch, blistering/browning, and flavor.

Additionally, some mozzarella-like products, e.g., string cheese, are being used on pizzas in unique ways to diversify products within this industry, and yet the expectations as to performance characteristics of the cheese are similar to those previously described.

It is the desire of the end users that, even with the expanded application of mozzarella cheese varieties, and even with the use of mozzarella-like products, the finished product performance characteristics, especially those for melt characteristics, be uniformly good, regardless of how the mozzarella is used (e.g., with what other ingredients) or how it is baked.

Prior to this invention, manufacturers of mozzarella cheeses have been limited in their ability to satisfy fully the desire of being able to produce a cheese which would result in similar if not identical melt characteristics, independent of its application, and thus the end user, especially within the pizza industry, has had to lower his or her expectations as to the cheese having similar melt characteristics over a wide range of conditions (styles of pizzas, types of ovens, cook conditions, etc.). The cause for such a limitation is primarily due to the expanded application of mozzarella cheese, and mozzarella-like products, exceeding the ability of the cheese manufacturers to sufficiently alter the cheese's natural melt characteristics to result in similar, good melt performance over the broad range of applications to which a single type of cheese might be put.

In general, the melt characteristics of a mozzarella-type cheese is a function of the amount and/or source of heat, over a specified time, that is being transferred to the cheese during its baking. Thus one would conclude that if the amount and/or source of heat, and the time, were constant for any application of mozzarella cheese, that it would be feasible to expect similar melt characteristics. However, in its uses today, mozzarella cheese is not exposed to the same amount and/or source of heat, nor to the same time of exposure to the heat, with the result that the performance of the cheese, in terms of melt characteristics, can be substantially different from one application to the next. Some reasons why such cook conditions are not similar are due to the style of pizza being prepared; varying amounts of ingredients, thickness of crust, type of ingredients used, all of which will affect and alter the amount of heat available to cook and melt the cheese before the crust is finished baking. Additionally, the type of oven used and time of baking also have a significant impact on the amount and source of heat available for the melting of the cheese. FIG. 1 is a graph which charts the temperature profiles of three different pizza products as they were cooked in two different types of ovens. The terms "thick," "medium," and "thin" refer to the crust. The two types of oven used were conveyor and deck, as indicated. In each case, the pizza was left in the oven until the crust was baked to the desired end point. As depicted, there is a significant variation in the amount of heat available, expressed as temperature, over a varying amount of time, the result being that the melted mozzarella cheese on the finished pizzas has uniquely different melt characteristics. Some of the pizzas were fine, but others were less than desirable, in terms of the degree of stretchiness, meltdown, and/or blistering and browning.

Additionally, mozzarella-like products, e.g., string cheese, when used specifically within an outer lip of the crust of a pizza, is exposed to an atypical amount and source of heat, and without significant changes to the product, will not yield the desired melt characteristics.

The manufacturing processes, and thus the mozzarella products being produced today, are limited in their ability to achieve the desires of the end user in having products that have similar melt characteristics when cooked under a broad range of different applications. The limitations have been that changes in the manufacturing processes used to alter the melt characteristics do not alter the mozzarella cheese significantly enough to result in good melt characteristics over a broad range of different applications.

Additionally it should be understood that manufacturers of process cheeses and imitation mozzarella cheeses have not achieved the manufacturing of products that fulfill these expectations either.

BRIEF DESCRIPTION OF THE INVENTION

The conventional process of manufacturing a mozzarella variety of cheese or a mozzarella-like cheese comprises the following steps:

a) pasteurizing cow's milk;

b) acidifying the milk to convert it to a cheese milk;

c) coagulating the cheese milk to obtain a coagulum comprised of curd and whey;

d) cutting the coagulum and draining the whey therefrom, thereby leaving a cheese curd;

e) heating, kneading, and stretching the cheese curd until it is a homogeneous, fibrous mass of heated, unripened mozzarella variety cheese;

f) forming the heated cheese into a shape;

g) cooling the shaped cheese in cold brine; and h) removing the cooled cheese from the brine.

Such a mozzarella variety of cheese may have a moisture content in the range of about 45 to 60 weight percent and a milkfat content of at least about 30 weight percent (dried solids basis).

We have discovered that by the addition of an emulsifier to the mozzarella curd after it has been heated/stretched, but prior to being formed into a specific size or shape, one can alter the product significantly enough that it can exhibit similar (good) melt characteristics independent of its application.

More specifically, this additional step of incorporating a food grade emulsifier has been found not to be limited to a specific manufacturing process and can also be used independent of the final form in which the mozzarella cheese may be packaged (i.e., block, gas flush, and/or frozen). Additionally, this invention allows a manufacturer to produce mozzarella-like products such as string cheese that are functional when used on a pizza. It has been discovered that various emulsifiers can be used in such a manner as to alter the mozzarella cheese being produced to result in product(s) that have similar melt characteristics over a broad range of applications.

Food additives, such as emulsifiers, etc., have been used by the process cheese and imitation cheese industries, and they have been coated on the outside of frozen particles of mozzarella cheese. However, the present process is unique in that an additional step can be employed in any mozzarella manufacturing process, and not alter or change the basic process of making mozzarella, but instead add to this process a step by which products with more desired characteristics can be manufactured. Additionally, it has been discovered that the use of food additives in this manner can result in a more desired product than when such food additives are used as coatings and/or in the manufacture of process and/or imitation cheese. Without wishing to be bound by theory, it is believed that this difference, as regards process and imitation cheese, may be due, at least in part, to the emulsifier in the present process being added to the molten cheese while the latter is at a lower temperature than is the cheese base at the time of emulsifier addition when making process or imitation cheese. Also, it is believed that the improved result might also be due, at least in part, to the different protein structure of the cheese at the time of the blending in of the emulsifier. In the present process the curd has not undergone the proteolysis that process cheese has and that conventional, coated mozzarella has.

Finally, manufacturers of mozzarella-like products such as string cheese have not had available alternative manufacturing processes to alter the characteristics of their products to be more functional as a cheese to be used on, or within, the crust of a pizza.

BRIEF DESCRIPTION OF THE DRAWINGS

FIG. 2a depicts the step in the process traditionally used to heat/stretch curd; FIG. 2d is the step in the process in which the molten cheese is formed/molded, and FIG. 2e is the chilling/brining step employed in manufacturing mozzarella cheese. FIG. 2b is the additional process step to add the food additive or additives on a continuous basis; FIG. 2c depicts equipment to meter and add the food additive(s). The equipment used in this additional step is such that it will retain the heat of the molten cheese and allow thorough mixing into the molten cheese of the food additive(s) being used.

DETAILED DESCRIPTION OF THE INVENTION

Figure 1:
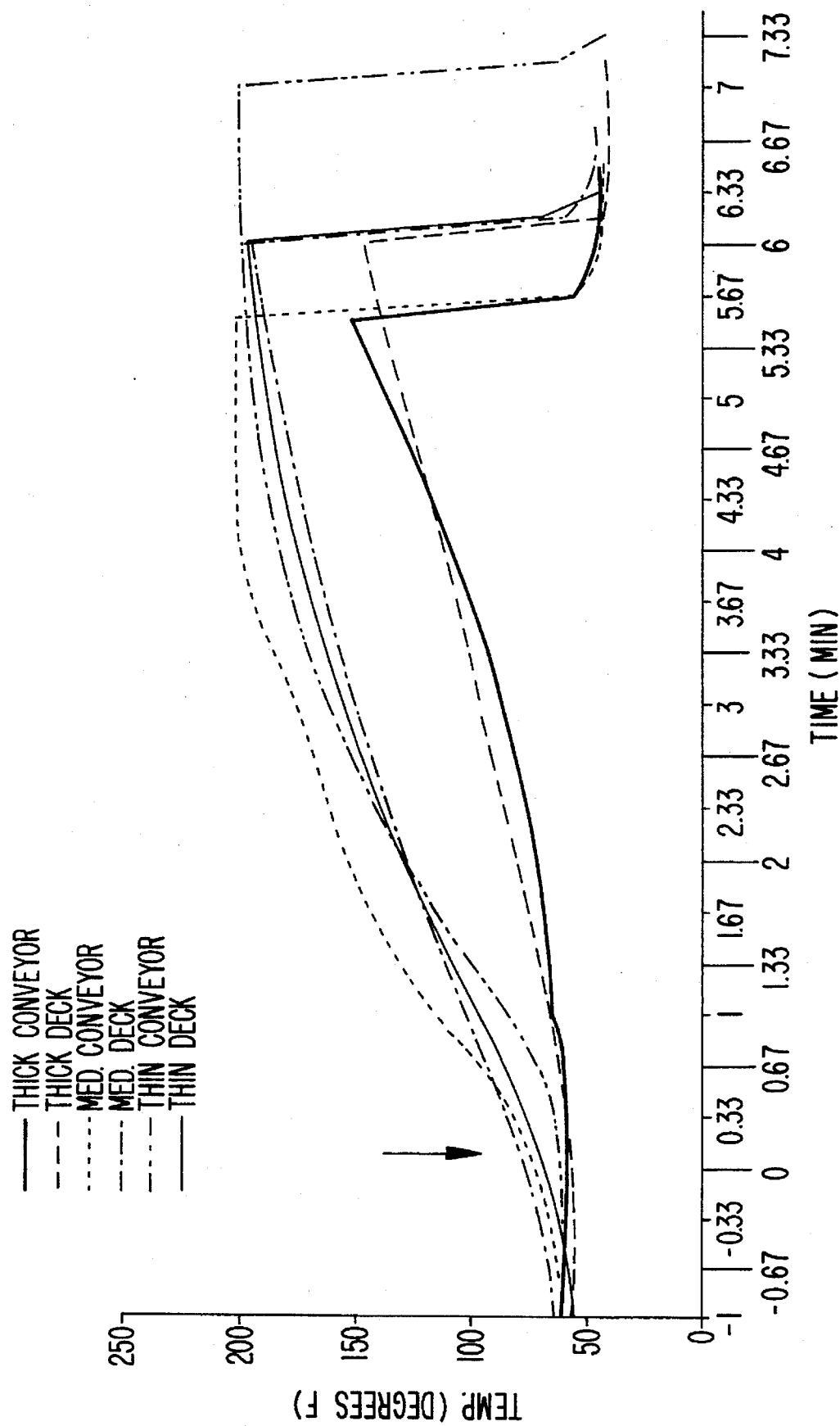
FIG. 1 has been described.
Figure 2:
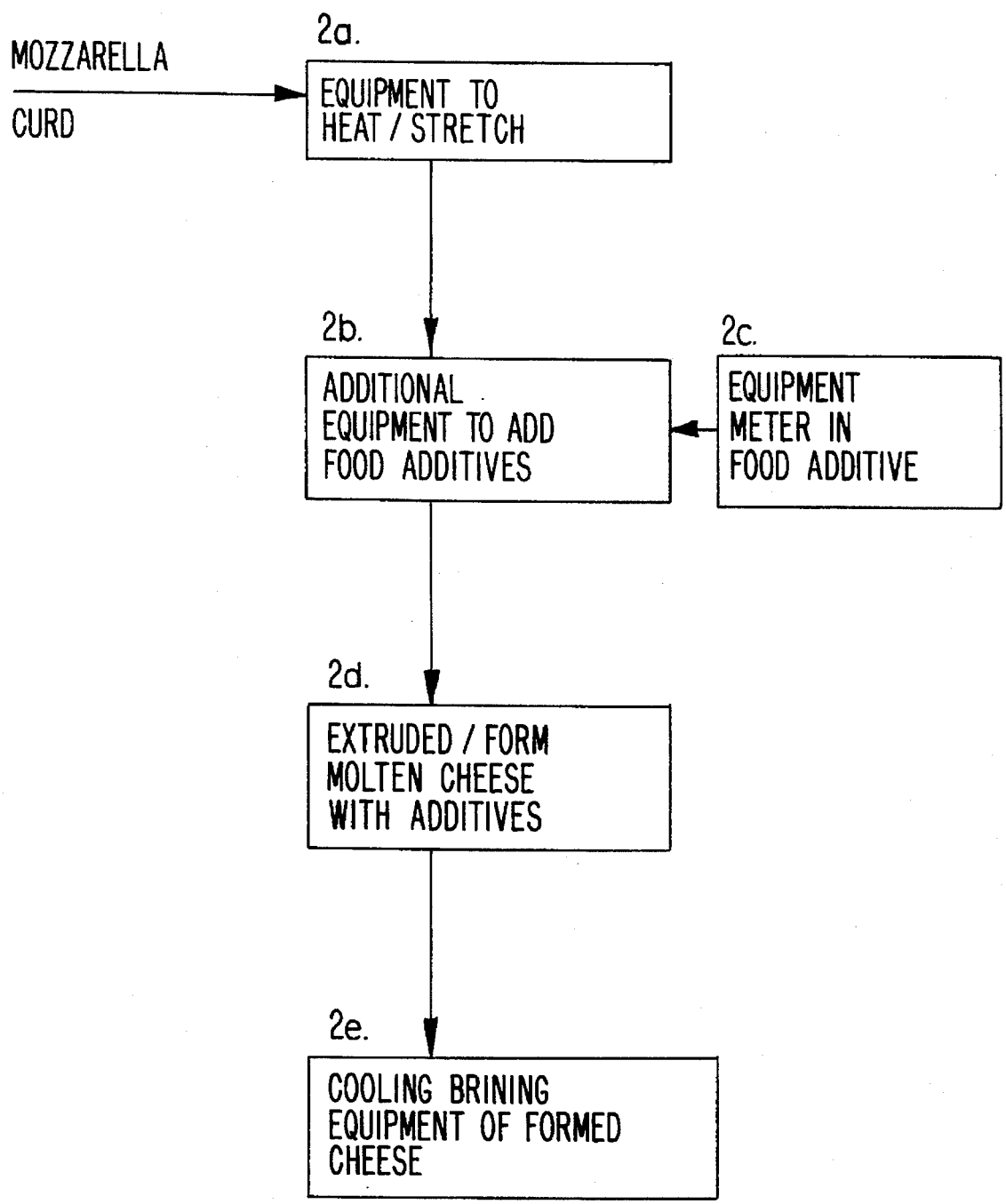
FIG. 2 depicts a typical mozzarella manufacturing process to which the additional processing step of the present invention is incorporated to add the various food additives.

This discovery is unique in that prior to it, the ability of manufacturers of mozzarella cheese and/or manufacturers of process cheese and imitation cheeses were limited in their ability to produce mozzarella products which achieved the melt characteristics desired of mozzarella cheese regardless of its application; and, typically, it has been the end user who has been required to temper his expectations in that regard. This discovery enables the manufacturers to produce varieties of mozzarella cheese and mozzarella-like products which meet all of the desired melt characteristics, independent of the application, while not altering the overall handling/portioning qualities of the cheese.

This invention employs a step in the manufacturing of mozzarella cheese in which one or more cheese emulsifiers, e.g., selected from the group consisting of phosphates and citrates, such as sodium citrate, sodium hexametaphosphates and mono- and di-phosphates, can be mixed into molten mozzarella cheese after it has been heated/stretched, but prior to the forming and brining/chilling of the molten mozzarella cheese. These additives are used at a level not to exceed what is considered to be generally recognized as safe (GRAS), and more typically are to be used at levels of about 0.01% to 2%, e.g., about 0.5 to 2%, of the weight of the finished mozzarella cheese. These additives can be incorporated into the molten cheese in a dry form, but the preferred method is first to make an aqueous solution of the additive(s), typically in the range of about 5 to 50 wt. % solids, e.g., about 20–40%, which is then added to the molten cheese.

Each of these food additives can be added at various levels, depending upon the change in performance characteristics one is trying to impact, and to what degree. These additives are typically added into molten mozzarella cheese which has a temperature of about 110° to 160° F. The additive is thoroughly mixed into the molten cheese at this temperature in a separate piece of equipment that will mix the additive thoroughly into the molten mozzarella cheese. One such piece of equipment is a jacketed mixer, with twin screw augers arranged such that they overlap, ensuring thorough mixing. The size of such equipment is preferably such that the dwell time of the molten cheese in the mixer is in the range of about 2 to 10 minutes, and such that the flow of cheese from the equipment used to heat/stretch the curd to the equipment to form the molten cheese is continuous.

The emulsifier preferably is a cheese emulsifier that sequesters calcium ions in the cheese—i.e., reduces the degree to which the calcium is ionically bound to the protein in the cheese.

This process is unique in that it can provide a continuous system for adding to molten mozzarella, food additives that can be used to alter the finished mozzarella, which will allow similar and desired performance characteristics to be achieved when the cheese is used under a variety of applications.

In the forming step, the heated cheese can be formed into a shape by being extruded as a continuous ribbon into cold sodium chloride brine. The cheese ribbon can be held in cold sodium chloride brine until its core temperature drops to about 75° F. or below. The cooled ribbon can be subsequently cut into sections. Those sections of cooled cheese can then be committed, and the comminuted cheese can then be quick frozen.

It has been discovered that by incorporating food additives in this manner, that the end product is significantly different from that which would be produced as a processed or imitation cheese. It is believed that part of the uniqueness of this manufacturing process is that the food additive is being added to molten mozzarella cheese at temperatures lower than that commonly used in making processed and/or imitation cheeses. Also, it is being added to a cheese (or curd) that has not been aged at all and which, therefore, has had little, if any, degradation of the protein structure by proteolysis. The end result is an ability to alter the melt characteristics of the mozzarella cheese without losing the typical melt performance of mozzarella cheese when melted, that being the meltdown, stretch and browning/blistering characteristics. Additionally, it has been discovered that this process, and the resultant product(s) manufactured, are able to meet all of the desired performance characteristics under a more diverse set of possible applications than when such additives are applied merely as a coating to the formed cheese.

It has been discovered that once the mozzarella-type string cheese of the present invention is thawed by the customer, and then rolled into the crust of a pizza and baked, it exhibits the desired meltdown properties, being "stringy," as would a traditional string cheese which had been frozen and/or refrigerated, yet having a short texture, so that it can be relatively cleanly bitten off when the pizza has cooled, as can a process cheese, but will still come slightly out of its channel in the crust, without being runny.

EXAMPLE I

Figure 3:
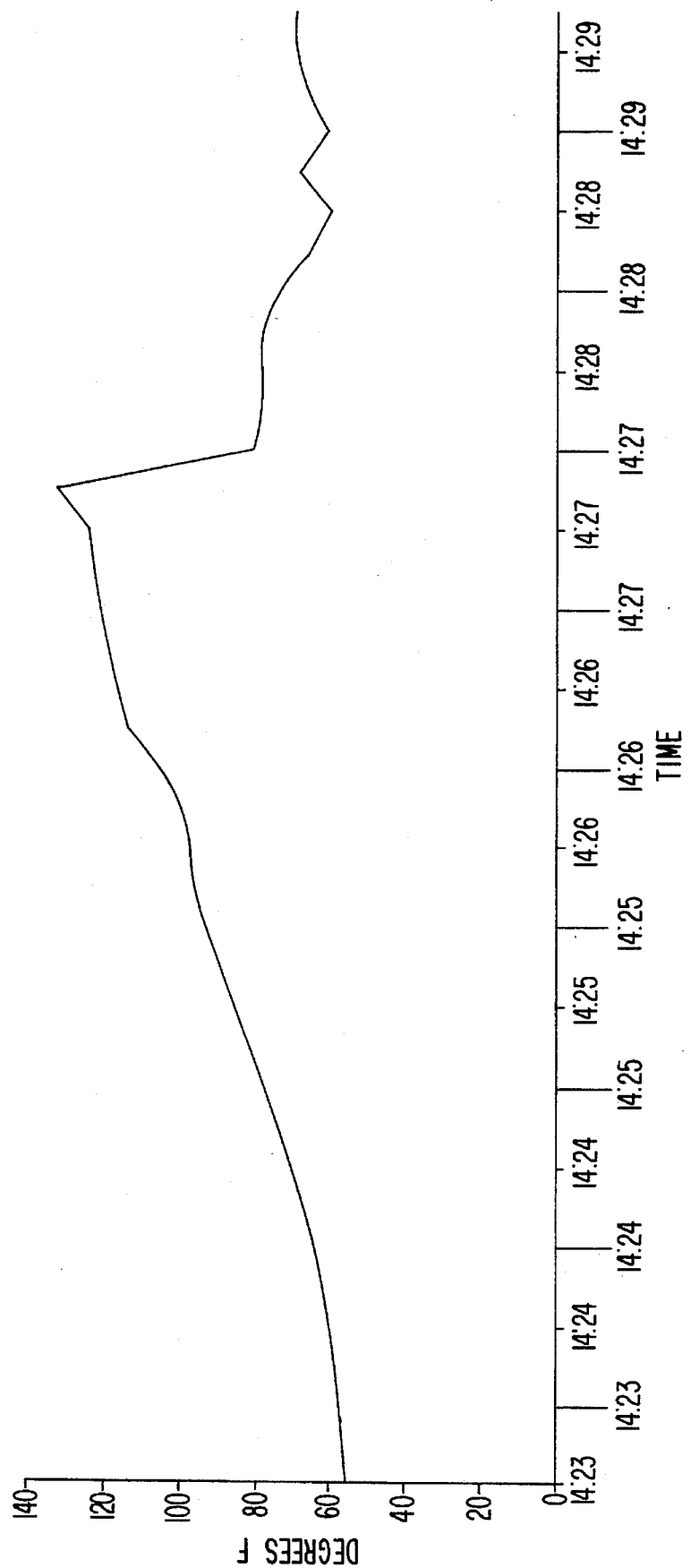
FIG. 3 is a time/temperature graph of mozzarella cheese of the prior art as it is being baked on a thick crust pizza. It shows that the crust was done before the temperature of the cheese even reached 140° F. Ideally the cheese should reach a temperature of at least 150° F. before the crust is fully baked, in order for the cheese to reach the optimum stage of meltdown, stretchiness, and browning/blistering.

Mozzarella cheese was manufactured by the process described in Barz, et al, U.S. Pat. No. 5,200,216, which is hereby incorporated herein by reference. As described in said patent, the pasteurized cow's milk was converted into a cheese milk by fermenting the milk with lactic acid-producing bacteria. The product composition was such that the final product had a moisture of 53.5%, FDB (fat on a dry basis) of 47.1%, a pH of 5.25, and a salt content of 1.40%. After the heating/stretching of the molten mozzarella, at 120° F., half of the molten cheese was treated such that 1% of sodium hexametaphosphate (added in the form of a 50 wt. % aqueous solution) by weight of the molten cheese was added to the molten cheese. This mixture was thoroughly mixed in the cheese by use of a twin screw auger mixer for 2 minutes and then formed into ribbons, comminuted and IQF frozen as described by Barz, et al, U.S. Pat. No. 5,200,216. The other half of the molten cheese was finished in a similar manner, but excluding the addition of the sodium hexametaphosphate. Both products were thawed for three days and then cooked on a thick crust pizza, a style of product in which desired performance characteristics are often not achieved, due to the relatively low cheese temperatures achieved during cooking. (See the preceding discussion of the time/temperature graph of FIG. 3.) The product manufactured without the use of additives resulted in a melted product which did not exhibit the desired, and typical, melt characteristics, in that it lacked meltdown, stretch and browning/blistering, which are expected for mozzarella cheese. The new product, with the addition of sodium hexametaphosphate, did exhibit the desired characteristics. Both cheeses would perform well in some other applications, however, for example when baked on the more conventional thin crust pizza.

EXAMPLE II

A mozzarella-like string cheese was produced using the manufacturing process outlined in Kielsmeier, et al, U.S.

Pat. No. 3,961,077, which is hereby incorporated herein by reference. The final composition of the product was 52.5% moisture, FDB of 38.6, % pH of 5.20 and a salt content of 2.3%. After the heating/stretching of the curd into a molten mass, 0.8% sodium hexametaphosphate (in a 50% aqueous solution) was mixed into one-half of the cheese, at a temperature of 110° F., using a twin screw auger mixer for 2 minutes, prior to it being formed into a string cheese product. The other half of the molten cheese had no additives mixed into it. Both products were separately formed into cylinders of approximately ⅝" diameter and a length of 7⅝". Then they were brined and chilled in a 10° F. brine for twenty minutes and frozen using a frozen carbon dioxide freezer chamber. Both products were then thawed for three days, after which they were rolled into the outer crust (lip) of a pizza and baked under typical pizzeria cook conditions. The resultant products differed significantly, in that the product without the additive did not melt; nor did it stretch. It remained virtually intact, making it unacceptable for this application. The string cheese with the additive, however, displayed the desired melt and stretch characteristics, allowing the string cheese now to be used as part of preparing a pizza.

We claim:

1. In a process of manufacturing a mozzarella variety of cheese or a mozzarella-like cheese comprising the following steps:
   a) pasteurizing cow's milk;
   b) acidifying the milk to convert it to a cheese milk;
   c) coagulating the cheese milk to obtain a coagulum comprised of curd and whey;
   d) cutting the coagulum and draining the whey therefrom, thereby leaving a cheese curd;
   e) heating, kneading, and stretching the cheese curd until it is a homogeneous, fibrous mass of heated, unripened cheese;
   f) forming the heated cheese into a shape;
   g) cooling the shaped cheese in cold brine; and
   h) removing the cooled cheese from the brine;
   the improvement wherein, between said steps (e) and (f), a GRAS cheese emulsifier is mixed into the heated cheese in an amount of about 0.01 to 2 percent, based on the weight of the cheese.

2. The process of claim 1 wherein the emulsifier is selected from the group consisting of phosphates and citrates.

3. The process of claim 1 wherein the emulsifier is selected from the group consisting of sodium hexametaphosphate, sodium monophosphate, sodium diphosphate, and sodium citrate.

4. The process of claim 3 wherein the emulsifier is mixed into the cheese in the form of an aqueous solution containing about 5 to 50 percent of said emulsifier, based on the weight of the solution.

5. The process of claim 4 wherein the cheese is a mozzarella variety of cheese having a moisture content in the range of about 45 to 60 weight percent and a milkfat content of at least about 30 weight percent, on a dried solids basis.

6. The process of claim 4 wherein, in step (f), the cheese is formed into the shape of string cheese.

7. The process of claim 1 wherein, in step (f), the heated cheese is formed into a shape by being extruded as a continuous ribbon into cold sodium chloride brine and, in step (g), the cheese ribbon is held in cold sodium chloride brine until its core temperature drops to about 75° F. or below, and wherein the cooled ribbon is subsequently cut into sections, the sections of cooled cheese are comminuted, and the comminuted cheese is then quick frozen.

8. In a process of manufacturing a mozzarella variety of cheese or a mozzarella-like cheese comprising the following steps:
   a) pasteurizing cow's milk;
   b) acidifying the milk to convert it into a cheese milk;
   c) coagulating the cheese milk to obtain a coagulum comprised of curd and whey;
   d) cutting the coagulum and draining the whey therefrom, thereby leaving a cheese curd;
   e) heating, kneading, and stretching the cheese curd until it is a homogeneous, fibrous mass of heated, unripened cheese;
   f) forming the heated cheese into a shape;
   g) cooling the shaped cheese in cold brine; and
   h) removing the cooled cheese from the brine;
   the improvement wherein, between said steps (e) and (f), a phosphate or citrate cheese emulsifying salt is mixed into the heated cheese in an amount of about 0.01 to 2 percent, based on the weight of the cheese, while maintaining the temperature of the cheese at no more than 160° F.

9. The process of claim 8 wherein the emulsifying salt is a sodium salt.

10. The process of claim 9 wherein the emulsifying salt is mixed into the cheese in the form of an aqueous solution containing about 5 to 50 percent of the salt, based on the weight of the solution.

11. The process of claim 10 wherein, after step (h), the cheese has a moisture content in the range of about 45 to 60 weight percent and a milkfat content of at least about 30 weight percent, on a dried solids basis.

12. The process of claim 11 wherein the temperature of the cheese is maintained in the range of about 110° to 160° F. while the aqueous solution of emulsifying salt is mixed into the cheese.

13. The process of claim 12 wherein the aqueous solution of emulsifying salt is mixed into the heated cheese for a period of time ranging from about 2 to 10 minutes, before the cheese is formed into a shape.

14. The process of claim 13 wherein the emulsifying salt is selected from the group consisting of sodium hexametaphosphate and sodium citrate.

15. The process of claim 12 wherein, in step (f), the heated cheese is formed into a shape by being extruded into cold sodium chloride brine and, in step (g), the cheese extrudate is held in cold sodium chloride brine until its core temperature drops to about 75° F. or below, and wherein the cooled extrudate is subsequently cut into sections.

16. The process of claim 13 wherein, in step (f), the heated cheese is formed into a shape by being extruded into cold sodium chloride brine and, in step (g), the cheese extrudate is held in cold sodium chloride brine until its core temperature drops to about 75° F. or below, and wherein the cooled extrudate is subsequently cut into sections.

17. The process of claim 14 wherein, in step (f), the heated cheese is formed into a shape by being extruded into cold sodium chloride brine and, in step (g), the cheese extrudate is held in cold sodium chloride brine until its core temperature drops to about 75° F. or below, and wherein the cooled extrudate is subsequently cut into sections.

* * * * *

UNITED STATES PATENT AND TRADEMARK OFFICE
CERTIFICATE OF CORRECTION

PATENT NO. : 5,567,464
DATED : October 22, 1996
INVENTOR(S) : RICHARD LEE BARZ, ET AL.

It is certified that error appears in the above-identified patent and that said Letters Patent is hereby corrected as shown below:

COLUMN 1

Line 56, "baking  The" should read --baking.  The--.

COLUMN 6

Line 2, "committed," should read --comminuted,--.

COLUMN 7

Line 3, "38.6, %" should read --38.6%,--.

Signed and Sealed this

Fourth Day of November, 1997

Attest:

BRUCE LEHMAN

Attesting Officer        Commissioner of Patents and Trademarks